United States Patent
Kim et al.

(10) Patent No.: US 10,579,924 B1
(45) Date of Patent: Mar. 3, 2020

(54) LEARNING METHOD, LEARNING DEVICE WITH MULTI-FEEDING LAYERS AND TESTING METHOD, TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/132,479

(22) Filed: Sep. 17, 2018

(51) Int. Cl.
*G06N 3/08* (2006.01)
*G06N 5/04* (2006.01)
(Continued)

(52) U.S. Cl.
CPC ............... *G06N 3/084* (2013.01); *G06N 3/04* (2013.01); *G06N 5/046* (2013.01); *G06T 7/10* (2017.01)

(58) Field of Classification Search
CPC . G06T 7/10; G06N 3/084; G06N 3/04; G06N 5/046
See application file for complete search history.

(56) References Cited

U.S. PATENT DOCUMENTS

2014/0355861 A1* 12/2014 Nirenberg .............. H04N 19/85
382/133
2016/0104058 A1* 4/2016 He ....................... G06K 9/6255
382/156
(Continued)

FOREIGN PATENT DOCUMENTS

CN 108346145 A 7/2018

OTHER PUBLICATIONS

Adit Deshpande (Deshpande-1) "A Beginner's Guide to Understanding Convolutional Neural Networks" Jul. 2016 [Online] Downloaded Mar. 12, 2019 https://adeshpande3.github.io/adeshpande3.github.io/A-Beginner's-Guide-To-Understanding-Convolutional-Neural-Networks/ (Year: 2016).*

(Continued)

*Primary Examiner* — Ben M Rifkin
(74) *Attorney, Agent, or Firm* — Xsensus LLP

(57) ABSTRACT

A learning method for a CNN (Convolutional Neural Network) capable of encoding at least one training image with multiple feeding layers, wherein the CNN includes a 1st to an n-th convolutional layers, which respectively generate a 1st to an n-th main feature maps by applying convolution operations to the training image, and a 1st to an h-th feeding layers respectively corresponding to h convolutional layers ($1 \leq h \leq n-1$)) is provided. The learning method includes steps of: a learning device instructing the convolutional layers to generate the 1st to the n-th main feature maps, wherein the learning device instructs a k-th convolutional layer to acquire a (k-1)-th main feature map and an m-th sub feature map, and to generate a k-th main feature map by applying the convolution operations to the (k-1)-th integrated feature map generated by integrating the (k-1)-th main feature map and the m-th sub feature map.

30 Claims, 3 Drawing Sheets

(51) Int. Cl.
*G06N 3/04* (2006.01)
*G06T 7/10* (2017.01)

(56) References Cited

U.S. PATENT DOCUMENTS

2016/0283841 A1* 9/2016 Sainath .................. G10L 15/16
2017/0206431 A1* 7/2017 Sun ....................... G06N 3/084

OTHER PUBLICATIONS

Adit Deshpande (Deshpande-2) "A beginner's Guide to Understanding Convolutional Neural Networks part 2" Jul. 29, 2016 [Online] Downloaded Mar. 12, 2019 https://adeshpande3.github.io/adeshpande3.github.io/A-Beginner's-Guide-To-Understanding-Convolutional-Neural-Networks-Part-2/ (Year: 2016).*
Gao Huang et al., "Densely Connected Convolutional Networks", 2017 IEEE Conference on Computer Vision and Pattern Recognition, XP33249569A, 9 pp.

* cited by examiner

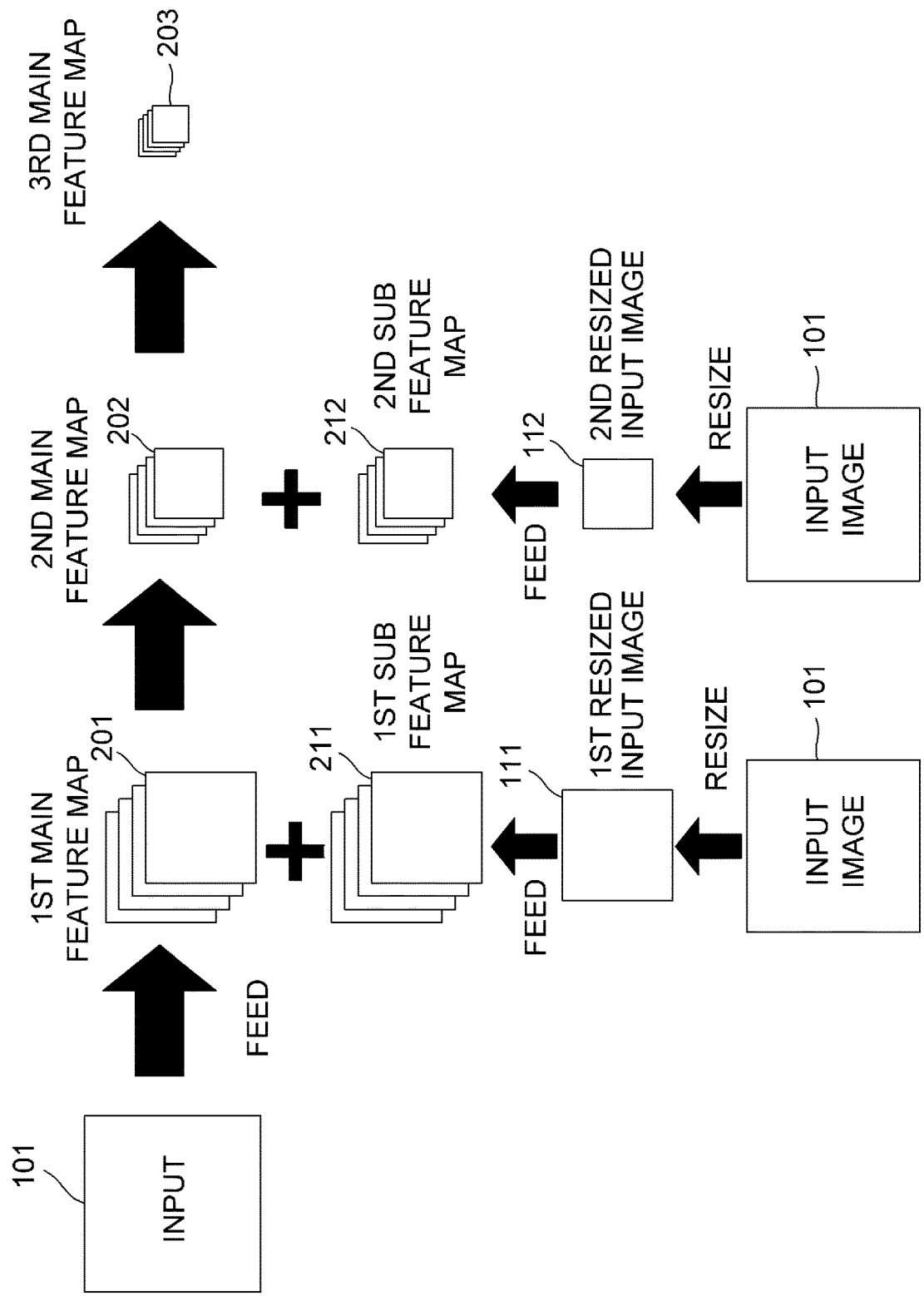

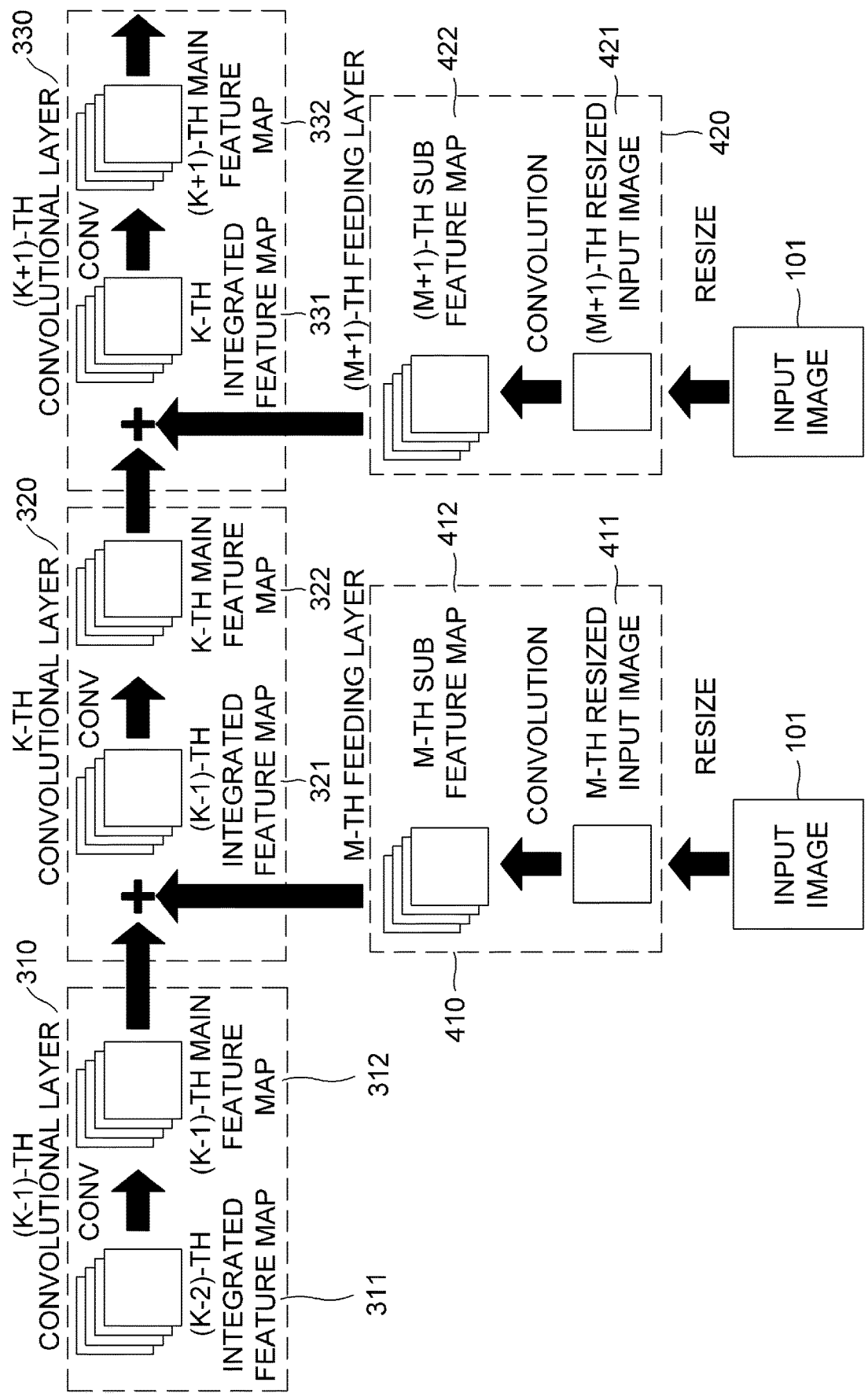

ial layers and a 1st to an h-th feeding layers
LEARNING METHOD, LEARNING DEVICE WITH MULTI-FEEDING LAYERS AND TESTING METHOD, TESTING DEVICE USING THE SAME

FIELD OF THE INVENTION

The present invention relates to a learning method and a learning device with one or more multi-feeding layers, and a testing method and a testing device using the same; and more particularly, to the learning method for a CNN (Convolutional Neural Network) capable of encoding at least one training image with one or more multiple feeding layers, wherein the CNN includes a 1st to an n-th convolutional layers, which respectively generate a 1st to an n-th main feature maps by applying one or more convolution operations to the training image, and a 1st to an h-th feeding layers respectively corresponding to h convolutional layers among the n convolutional layers, and wherein the h is an integer from 1 to (n−1), including steps of: (a) a learning device acquiring the training image; and (b) the learning device instructing each of the convolutional layers to apply the convolution operations to the training image or a main feature map from its previous convolutional layer, to thereby generate each of the 1st to the n-th main feature maps, wherein the learning device instructs a k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map from a (k−1)-th convolutional layer and an m-th sub feature map, which is obtained by resizing the training image into a size of the (k−1)-th main feature map, from an m-th feeding layer corresponding to the k-th convolutional layer, (ii) generate a (k−1)-th integrated feature map by integrating the (k−1)-th main feature map and the m-th sub feature map, and (iii) generate a k-th main feature map by applying the convolution operations to the (k−1)-th integrated feature map; the learning device, the testing method and the testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 is a drawing schematically illustrating a conventional process of a general feeding of an input image by using a CNN.

By referring to FIG. 1, the input image 101 is fed once to a CNN in a conventional CNN operation. For example, the CNN receives the input image and instructs multiple convolutional layers to apply multiple convolution operations and non-linear operations such as ReLU, to thereby generate feature maps 102, 103, and 104 sequentially. Next, the final feature map 104 or at least some of the feature maps may be used to detect an object or to get a result of a segmentation.

Such conventional CNN operation has a problem of, once the input image is fed, losing detailed information of the input image while the feature maps are generated through the multiple convolutional layers.

SUMMARY OF THE INVENTION

It is an object of the present invention to solve all the aforementioned problems.

It is another object of the present invention to provide a method for preserving detailed information of an input image even if consecutive convolution operations are applied to the input image through a CNN device.

In accordance with one aspect of the present invention, there is provided a learning method for a CNN (Convolutional Neural Network) capable of encoding at least one training image with one or more multiple feeding layers, wherein the CNN includes a 1st to an n-th convolutional layers, which respectively generate a 1st to an n-th main feature maps by applying one or more convolution operations to the training image, and a 1st to an h-th feeding layers respectively corresponding to h convolutional layers among the n convolutional layers, and wherein the h is an integer from 1 to (n−1), including steps of: (a) a learning device acquiring the training image; and (b) the learning device instructing each of the convolutional layers to apply the convolution operations to the training image or a main feature map from its previous convolutional layer, to thereby generate each of the 1st to the n-th main feature maps, wherein the learning device instructs a k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map from a (k−1)-th convolutional layer and an m-th sub feature map, which is obtained by resizing the training image into a size of the (k−1)-th main feature map, from an m-th feeding layer corresponding to the k-th convolutional layer, (ii) generate a (k−1)-th integrated feature map by integrating the (k−1)-th main feature map and the m-th sub feature map, and (iii) generate a k-th main feature map by applying the convolution operations to the (k−1)-th integrated feature map.

As one example, the step of (b) includes steps of: (b-1) the learning device instructing the m-th feeding layer to generate an m-th resized training image by resizing the training image into the size of the (k−1)-th main feature map; (b-2) the learning device instructing the m-th feeding layer to generate the m-th sub feature map by applying the convolution operations to the m-th resized training image; (b-3) the learning device instructing the k-th convolutional layer to generate the (k−1)-th integrated feature map by integrating the (k−1)-th main feature map and the m-th sub feature map; and (b-4) the learning device instructing the k-th convolutional layer to generate the k-th main feature map by applying the convolution operations to the (k−1)-th integrated feature map.

As one example, at the step of (b-3), the (k−1)-th integrated feature map is generated by pixel-wise summation of the (k−1)-th main feature map and the m-th sub feature map.

As one example, at the step of (b-3), the (k−1)-th main feature map and the m-th sub feature map are concatenated to generate the (k−1)-th integrated feature map.

As one example, at the step of (b-2), the convolution operations are applied to the m-th resized training image so that the number of channels of the m-th sub feature map corresponds to the number of channels of the (k−1)-th main feature map.

As one example, the step of (b) includes steps of: (b-1) the learning device instructing the m-th feeding layer to generate the m-th sub feature map whose size corresponds to the size of the (k−1)-th main feature map by applying the convolution operations to the m-th resized training image; (b-2) the learning device instructing the k-th convolutional layer to generate the (k−1)-th integrated feature map by integrating the (k−1)-th main feature map and the m-th sub feature map; and (b-3) the learning device instructing the k-th convolutional layer to generate the k-th main feature map by applying the convolution operations to the (k−1)-th integrated feature map.

As one example, at the step of (b-1), the m-th sub feature map is generated such that the size and the number of the channels are same as those of the (k−1)-th main feature map.

As one example, the learning method further includes steps of: (c) the learning device instructing at least one FC layer to generate a detection result of at least one object in the training image by applying at least one FC operation to the n-th main feature map; and (d) the learning device outputting one or more loss values by referring to the detection result and its corresponding ground truth, to thereby learn one or more parameters of the CNN by backpropagating the loss values.

As one example, the learning method further includes steps of: (c) the learning device instructing a decoding layer to generate a segmentation result by inputting the n-th main feature map to the decoding layer; and (d) the learning device outputting one or more loss values by referring to the segmentation result and its corresponding ground truth, to thereby learn one or more parameters of the CNN by backpropagating the loss values.

In accordance with another aspect of the present invention, there is provided a testing method for a CNN (Convolutional Neural Network) capable of encoding at least one test image with one or more multiple feeding layers, wherein the CNN includes a 1st to an n-th convolutional layers, which respectively generate a 1st to an n-th main feature maps for testing by applying one or more convolution operations to the test image, and a 1st to an h-th feeding layers respectively corresponding to h convolutional layers among the n convolutional layers, and wherein the h is an integer from 1 to (n−1), including steps of: (a) a testing device acquiring the test image, on condition that a learning device (1) has instructed each of the convolutional layers to apply the convolution operations to at least one training image or a main feature map for training from its previous convolutional layer, to thereby generate each of the 1st to the n-th main feature maps for training, wherein the learning device has instructed a k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map for training from a (k−1)-th convolutional layer and an m-th sub feature map for training, which is obtained by resizing the training image into a size of the (k−1)-th main feature map for training, from an m-th feeding layer corresponding to the k-th convolutional layer, (ii) generate a (k−1)-th integrated feature map for training by integrating the (k−1)-th main feature map for training and the m-th sub feature map for training, and (iii) generate a k-th main feature map for training by applying the convolution operations to the (k−1)-th integrated feature map for training, and (2) has learned one or more parameters of the CNN; and (b) the testing device instructing each of the convolutional layers to apply the convolution operations to the test image or a main feature map for testing from its previous convolutional layer, to thereby generate each of the 1st to the n-th main feature maps for testing, wherein the testing device instructs the k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map for testing from the (k−1)-th convolutional layer and an m-th sub feature map for testing, which is obtained by resizing the test image into a size of the (k−1)-th main feature map for testing, from the m-th feeding layer corresponding to the k-th convolutional layer, (ii) generate a (k−1)-th integrated feature map for testing by integrating the (k−1)-th main feature map for testing and the m-th sub feature map for testing, and (iii) generate a k-th main feature map for testing by applying the convolution operations to the (k−1)-th integrated feature map for testing.

As one example, the step of (b) includes steps of: (b-1) the testing device instructing the m-th feeding layer to generate an m-th resized test image by resizing the test image into the size of the (k−1)-th main feature map for testing; (b-2) the testing device instructing the m-th feeding layer to generate the m-th sub feature map for testing by applying the convolution operations to the m-th resized test image; (b-3) the testing device instructing the k-th convolutional layer to generate the (k−1)-th integrated feature map for testing by integrating the (k−1)-th main feature map for testing and the m-th sub feature map for testing; and (b-4) the testing device instructing the k-th convolutional layer to generate the k-th main feature map for testing by applying the convolution operations to the (k−1)-th integrated feature map for testing.

As one example, at the step of (b-3), the (k−1)-th integrated feature map for testing is generated by pixel-wise summation of the (k−1)-th main feature map for testing and the m-th sub feature map for testing.

As one example, at the step of (b-3), the (k−1)-th main feature map for testing and the m-th sub feature map for testing are concatenated to generate the (k−1)-th integrated feature map for testing.

As one example, the step of (b) includes steps of: (b-1) the testing device instructing the m-th feeding layer to generate the m-th sub feature map for testing whose size corresponds to the size of the (k−1)-th main feature map for testing by applying the convolution operations to the m-th resized test image; (b-2) the testing device instructing the k-th convolutional layer to generate the (k−1)-th integrated feature map for testing by integrating the (k−1)-th main feature map for testing and the m-th sub feature map for testing; and (b-3) the testing device instructing the k-th convolutional layer to generate the k-th main feature map for testing by applying the convolution operations to the (k−1)-th integrated feature map for testing.

As one example, at the step of (b-1), the m-th sub feature map for testing is generated such that the size and the number of the channels are same as those of the (k−1)-th main feature map for testing.

In accordance with still another aspect of the present invention, there is provided a learning device for a CNN (Convolutional Neural Network) capable of encoding at least one training image with one or more multiple feeding layers, wherein the CNN includes a 1st to an n-th convolutional layers, which respectively generate a 1st to an n-th main feature maps by applying one or more convolution operations to the training image, and a 1st to an h-th feeding layers respectively corresponding to h convolutional layers among the n convolutional layers, and wherein the h is an integer from 1 to (n−1), including: a communication part for acquiring the training image; and a processor for performing a process of (I) instructing each of the convolutional layers to apply the convolution operations to the training image or a main feature map from its previous convolutional layer, to thereby generate each of the 1st to the n-th main feature maps, wherein the processor instructs a k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map from a (k−1)-th convolutional layer and an m-th sub feature map, which is obtained by resizing the training image into a size of the (k−1)-th main feature map, from an m-th feeding layer corresponding to the k-th convolutional layer, (ii) generate a (k−1)-th integrated feature map by integrating the (k−1)-th main feature map and the m-th sub feature map, and (iii) generate a k-th main feature map by applying the convolution operations to the (k−1)-th integrated feature map.

As one example, the process of (I) includes processes of: (I-1) instructing the m-th feeding layer to generate an m-th resized training image by resizing the training image into the size of the (k−1)-th main feature map; (I-2) instructing the m-th feeding layer to generate the m-th sub feature map by applying the convolution operations to the m-th resized training image; (I-3) instructing the k-th convolutional layer to generate the (k−1)-th integrated feature map by integrating the (k−1)-th main feature map and the m-th sub feature map; and (I-4) instructing the k-th convolutional layer to generate the k-th main feature map by applying the convolution operations to the (k−1)-th integrated feature map.

As one example, at the process of (I-3), the (k−1)-th integrated feature map is generated by pixel-wise summation of the (k−1)-th main feature map and the m-th sub feature map. As one example, at the process of (I-3), the (k−1)-th main feature map and the m-th sub feature map are concatenated to generate the (k−1)-th integrated feature map.

As one example, at the process of (I-2), the convolution operations are applied to the m-th resized training image so that the number of channels of the m-th sub feature map corresponds to the number of channels of the (k−1)-th main feature map.

As one example, the process of (I) includes processes of: (I-1) instructing the m-th feeding layer to generate the m-th sub feature map whose size corresponds to the size of the (k−1)-th main feature map by applying the convolution operations to the m-th resized training image; (I-2) instructing the k-th convolutional layer to generate the (k−1)-th integrated feature map by integrating the (k−1)-th main feature map and the m-th sub feature map; and (I-3) instructing the k-th convolutional layer to generate the k-th main feature map by applying the convolution operations to the (k−1)-th integrated feature map.

As one example, at the process of (I-1), the m-th sub feature map is generated such that the size and the number of the channels are same as those of the (k−1)-th main feature map.

As one example, the processor further performs processes of: (II) instructing at least one FC layer to generate a detection result of at least one object in the training image by applying at least one FC operation to the n-th main feature map; and (III) outputting one or more loss values by referring to the detection result and its corresponding ground truth, to thereby learn one or more parameters of the CNN by backpropagating the loss values.

As one example, the processor further performs processes of: (II) instructing a decoding layer to generate a segmentation result by inputting the n-th main feature map to the decoding layer; and (III) outputting one or more loss values by referring to the segmentation result and its corresponding ground truth, to thereby learn one or more parameters of the CNN by backpropagating the loss values.

In accordance with still yet another aspect of the present invention, there is provided a testing device for a CNN (Convolutional Neural Network) capable of encoding at least one test image with one or more multiple feeding layers, wherein the CNN includes a 1st to an n-th convolutional layers, which respectively generate a 1st to an n-th main feature maps for testing by applying one or more convolution operations to the test image, and a 1st to an h-th feeding layers respectively corresponding to h convolutional layers among the n convolutional layers, and wherein the h is an integer from 1 to (n−1), including: a communication part for acquiring the test image, on condition that a learning device (1) has instructed each of the convolutional layers to apply the convolution operations to at least one training image or a main feature map for training from its previous convolutional layer, to thereby generate each of the 1st to the n-th main feature maps for training, wherein the learning device has instructed a k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map for training from a (k−1)-th convolutional layer and an m-th sub feature map for training, which is obtained by resizing the training image into a size of the (k−1)-th main feature map for training, from an m-th feeding layer corresponding to the k-th convolutional layer, (ii) generate a (k−1)-th integrated feature map for training by integrating the (k−1)-th main feature map for training and the m-th sub feature map for training, and (iii) generate a k-th main feature map for training by applying the convolution operations to the (k−1)-th integrated feature map for training, and (2) has learned one or more parameters of the CNN; and a processor for performing a process of: (I) instructing each of the convolutional layers to apply the convolution operations to the test image or a main feature map for testing from its previous convolutional layer, to thereby generate each of the 1st to the n-th main feature maps for testing, wherein the processor instructs the k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map for testing from the (k−1)-th convolutional layer and an m-th sub feature map for testing, which is obtained by resizing the test image into a size of the (k−1)-th main feature map for testing, from the m-th feeding layer corresponding to the k-th convolutional layer, (ii) generate a (k−1)-th integrated feature map for testing by integrating the (k−1)-th main feature map for testing and the m-th sub feature map for testing, and (iii) generate a k-th main feature map for testing by applying the convolution operations to the (k−1)-th integrated feature map for testing.

As one example, the process of (I) includes processes of: (I-1) instructing the m-th feeding layer to generate an m-th resized test image by resizing the test image into the size of the (k−1)-th main feature map for testing; (I-2) instructing the m-th feeding layer to generate the m-th sub feature map for testing by applying the convolution operations to the m-th resized test image; (I-3) instructing the k-th convolutional layer to generate the (k−1)-th integrated feature map for testing by integrating the (k−1)-th main feature map for testing and the m-th sub feature map for testing; and (I-4) instructing the k-th convolutional layer to generate the k-th main feature map for testing by applying the convolution operations to the (k−1)-th integrated feature map for testing.

As one example, at the process of (I-3), the (k−1)-th integrated feature map for testing is generated by pixel-wise summation of the (k−1)-th main feature map for testing and the m-th sub feature map for testing.

As one example, at the process of (I-3), the (k−1)-th main feature map for testing and the m-th sub feature map for testing are concatenated to generate the (k−1)-th integrated feature map for testing.

As one example, the process of (I) includes processes of: (I-1) instructing the m-th feeding layer to generate the m-th sub feature map for testing whose size corresponds to the size of the (k−1)-th main feature map for testing by applying the convolution operations to the m-th resized test image; (I-2) instructing the k-th convolutional layer to generate the (k−1)-th integrated feature map for testing by integrating the (k−1)-th main feature map for testing and the m-th sub feature map for testing; and (I-3) instructing the k-th convolutional layer to generate the k-th main feature map for testing by applying the convolution operations to the (k−1)-th integrated feature map for testing.

As one example, at the process of (I-1), the m-th sub feature map for testing is generated such that the size and the number of the channels are same as those of the (k−1)-th main feature map for testing.

BRIEF DESCRIPTION OF THE DRAWINGS

FIG. 2 is a drawing schematically illustrating multiple feeding configuration in a CNN in accordance with the present invention.

FIG. 3 is a drawing illustrating an exemplary process of generating the feature maps by multiple feeding of the input image in accordance with the present invention.

DETAILED DESCRIPTION OF THE PREFERRED EMBODIMENTS

Figure 1:
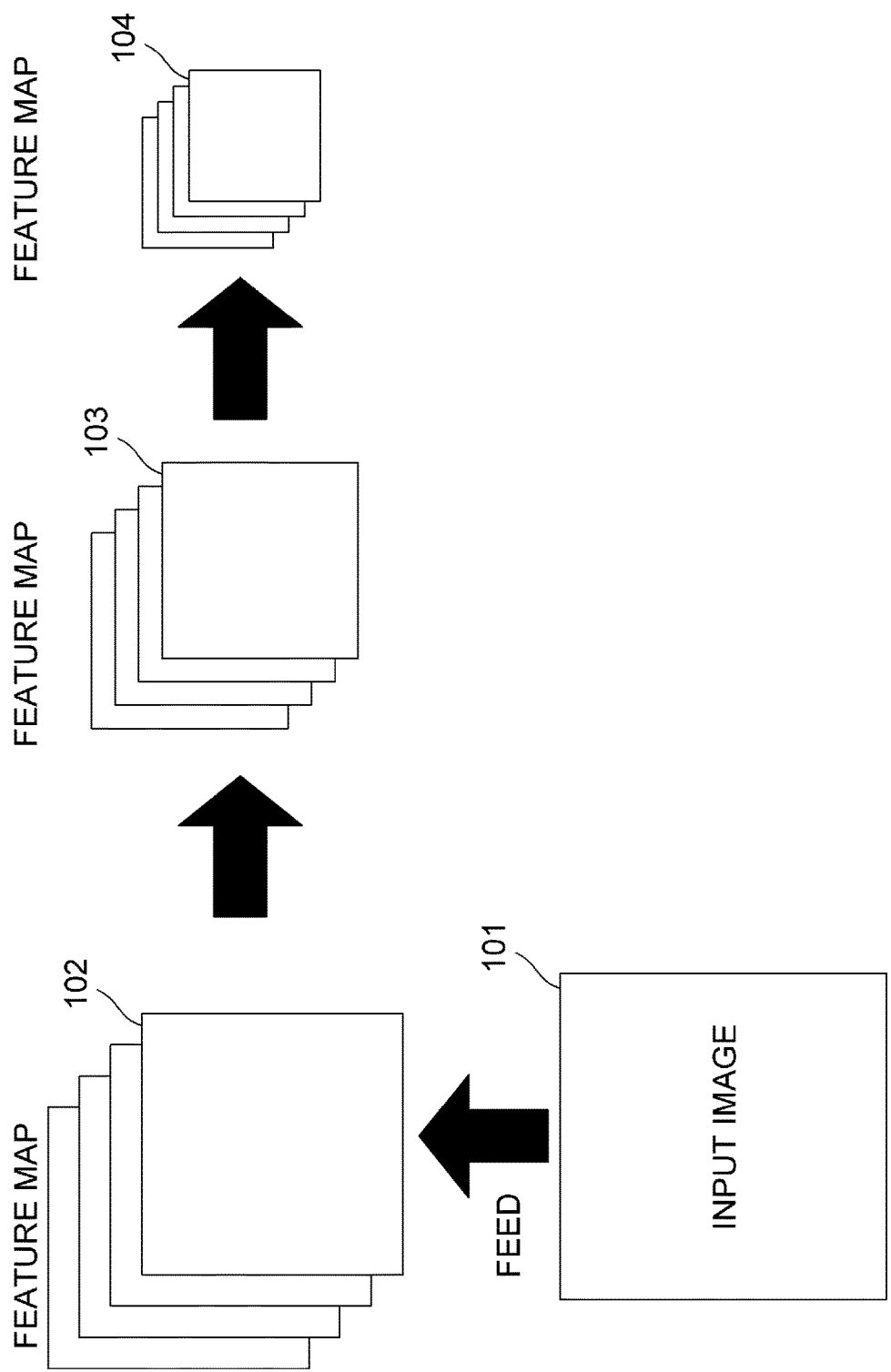
FIG. 1 is a drawing schematically illustrating a conventional process of a general feeding of an input image by using a CNN.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, similar reference numbers refer to a same or similar functionality throughout the several views.

To allow those skilled in the art to the present invention to be carried out easily, the example embodiments of the present invention by referring to attached drawings will be explained in detail as shown below.

FIG. 2 is a drawing schematically illustrating a method of multiple feeding configuration in a CNN in accordance with the present invention.

By referring to FIG. 2, when main feature maps 201, 202, and 203 are sequentially generated from one or more convolutional layers, the CNN in accordance with the present invention may instruct the convolutional layers to respectively use at least part of resized information of at least one input image 101.

That is, as illustrated in FIG. 2, the CNN, i.e., a CNN used by a learning device or a CNN used by a testing device, may acquire the input image 101 and may instruct a 1st convolutional layer to generate a 1st main feature map 201. In addition, the CNN may instruct a 2nd convolutional layer to generate a 2nd main feature map 202 by inputting a 1st integrated feature map to the 2nd convolutional layer, wherein the 1st integrated feature map is generated by integrating the 1st main feature map 201 and a 1st sub feature map 211 which is generated by referring to the input image 101. Herein, the 1st sub feature map 211 may be generated by applying one or more convolution operations to a 1st resized input image 111 which is generated by resizing the input image 101 into a size of the 1th main feature map 201. Also, the CNN may instruct a 3rd convolutional layer to generate a 3rd main feature map 203 by inputting a 2nd integrated feature map to the 3rd convolutional layer, wherein the 2nd integrated feature map is generated by integrating the 2nd main feature map 202 and a 2nd sub feature map 212 which is generated by referring to the input image 101. Herein, the 2nd sub feature map 212 may be generated by applying the convolution operations to a 2nd resized input image 112 which is generated by resizing the input image 101 into a size of the 2nd main future map 202. Meanwhile, a specific main feature map and a specific sub feature map may be integrated by a pixel-wise summation thereof. In this case, at least one 1×1 convolution operation may be applied to a specific resized input image so that the number of channels of the specific sub feature map can correspond to that of the specific main feature map. In another example, the specific main feature map and the specific sub feature map may be integrated by a concatenation thereof. In this case, the number of the channels of the specific sub feature map may not need to be identical to that of the specific main feature map.

The CNN in accordance with the present invention may feed each resized input image to every convolutional layer capable of generating its corresponding feature map, but it is not limited thereto. As another example, the CNN may feed each resized input image to only a part of the convolutional layers.

FIG. 3 is a drawing illustrating an exemplary process of generating the feature maps by the multiple feeding of the input image in accordance with the present invention.

The CNN, e.g., the CNN used by the learning device, in accordance with the present invention may include a 1st to an n-th convolutional layers which respectively generate a 1st to an n-th main feature maps by applying the convolution operations to at least one training image. Meanwhile, the CNN in accordance with the present invention may further include a 1st to an h-th feeding layers respectively corresponding to h convolutional layers among the n convolutional layers, wherein the h is an integer from 1 to (n−1). The CNN may include the (n−1) feeding layers corresponding to the (n−1) convolutional layers, that is, except the 1st convolutional layer without a need for a feeding layer because the training image is directly fed thereto. But, in order to reduce amount of operations, only the h convolutional layers corresponding to a part of the (n−1) convolutional layers, i.e., the 2nd to the n-th convolutional layers, may be included.

By referring to FIG. 3, the n convolutional layers of the CNN may generate the 1st to the n-th main feature maps by applying the convolution operations to the training image or a main feature map outputted from its previous convolutional layer. Herein, the h convolutional layers, which correspond to the 1st to the h-th feeding layers, among the 2nd to the n-th convolutional layers may perform a process of generating the feature maps as below.

Assuming a specific convolutional layer among the h convolutional layers is a k-th convolutional layer among the n convolutional layers, the k-th convolutional layer 320 may acquire (i) a (k−1)-th main feature map 312 outputted from a (k−1)-th convolutional layer 310 and (ii) an m-th sub feature map 412, which is obtained by resizing the training image 101 into a size of the (k−1)-th main feature map 312, from an m-th feeding layer 410 corresponding to the k-th convolutional layer 320. Moreover, the k-th convolutional layer 320 may generate a (k−1)-th integrated feature map 321 by integrating the (k−1)-th main feature map 312 and the m-th sub feature map 412, and may generate a k-th main feature map 322 by applying the convolution operations to the (k−1)-th integrated feature map 321.

This process may be described in detail by referring to FIG. 3, as below.

First, the m-th feeding layer 410 corresponding to the k-th convolutional layer 320 may generate an m-th resized training image 411 by resizing the training image 101 into the size of the (k−1)-th main feature map 312, and may generate the m-th sub feature map 412 by applying the convolution operations to the m-th resized training image 411. The convolution operations applied to the m-th resized training image 411 may generate the m-th sub feature map 412 to be integrated with the (k−1)-th main feature map 312. Further, for the pixel-wise summation, the convolution operations may be used to allow the number of channels of the m-th sub feature map 412 to correspond to that of the (k−1)-th main feature map 312. Then, the k-th convolutional layer 320 may generate the (k−1)-th integrated feature map 321 by integrating the (k−1)-th main feature map 312 and the m-th sub feature map 412.

Further, the k-th convolutional layer 320 may generate the k-th main feature map 322 by applying the convolution operations to the (k−1)-th integrated feature map 321. As aforementioned, the k-th convolutional layer 320 may generate the (k−1)-th integrated feature map 321 by the pixel-wise summation of the (k−1)-th main feature map 312 and the m-th sub feature map 412, or by the concatenation of the (k−1)-th main feature map 312 and the m-th sub feature map 412.

Similarly, an (m+1)-th feeding layer 420 corresponding to a (k+1)-th convolutional layer 330 may generate an (m+1)-th resized training image 421 by resizing the training image 101 into a size of the k-th main feature map 322 outputted from the k-th convolutional layer 320, and then may generate an (m+1)-th sub feature map 422 by applying the convolution operations to the (m+1)-th resized training image 421. Next, the (k+1)-th convolutional layer 330 may generate a k-th integrated feature map 331 by integrating the k-th main feature map 322 and the (m+1)-th sub feature map 422. In addition, the (k+1)-th convolutional layer 330 may generate a (k+1)-th main feature map 332 by applying the convolution operations to the k-th integrated feature map 331.

On the other hand, though not illustrated in FIG. 3, in another example embodiment in accordance with the present invention, other convolution operations may be applied to the training image 101 to change the size thereof and the number of channels thereof, to thereby generate each of the sub feature maps without resizing the training image 101. In this case, the m-th feeding layer 410 may apply the convolution operations to the training image 101, to thereby generate the m-th sub feature map 412 whose size corresponds to the size of the (k−1)-th main feature map 312 outputted from the (k−1)-th convolutional layer 310, and then the k-th convolutional layer 320 may generate the (k−1)-th integrated feature map 321 by integrating the (k−1)-th main feature map 312 and the m-th sub feature map 412. Similarly, the (m+1)-th feeding layer 420 may apply the convolution operations to the training image 101 to thereby generate the (m+1)-th sub feature map 422 whose size corresponds to the size of the k-th main feature map 322 outputted from the k-th convolutional layer 320, and then the (k+1)-th convolutional layer 330 may generate the k-th integrated feature map 331 by integrating the k-th main feature map 322 and the (m+1)-th sub feature map 422.

If the n-th main feature map is generated through the aforementioned processes, the CNN may perform one or more additional operations according to a purpose of the CNN. For instance, if the CNN is used by a learning device for detecting at least one specific object, the learning device may instruct at least one FC layer to generate a detection result of the specific object in the training image 101 by applying at least one FC operation to the n-th main feature map, and then output one or more loss values for a detection by referring to the detection result and its corresponding ground truth, to thereby learn one or more parameters of the CNN by backpropagating the loss values for the detection. If the CNN is used by a learning device for a segmentation, the learning device may instruct a decoding layer to generate a segmentation result by inputting the n-th main feature map to the decoding layer, and then output one or more loss values for the segmentation by referring to the segmentation result and its corresponding ground truth, to thereby learn the parameters of the CNN by backpropagating the loss values for the segmentation.

In case that the CNN is used by the testing device, the aforementioned processes may be applied to a testing method, to thereby output at least one CNN output for testing.

In this case, on condition that the learning device has learned the parameters of the CNN through the aforementioned processes, the testing device may generate the CNN output for testing of at least one test image. That is, the testing device may instruct each of the convolutional layers to apply the convolution operations to the test image or a main feature map for testing outputted from its previous convolutional layer, to thereby generate each of a 1st to an n-th main feature maps for testing, wherein the testing device may instruct the k-th convolutional layer which is one of the h convolutional layers respectively corresponding to the 1st to the h-th feeding layers, the h convolutional layers being selected from the 2nd to the n-th convolutional layers, to (i) acquire a (k−1)-th main feature map for testing from the (k−1)-th convolutional layer and an m-th sub feature map for testing, which is obtained by resizing the test image into a size of the (k−1)-th main feature map for testing, from the m-th feeding layer corresponding to the k-th convolutional layer, (ii) generate a (k−1)-th integrated feature map for testing by integrating the (k−1)-th main feature map for testing and the m-th sub feature map for testing, and (iii) generate a k-th main feature map for testing by applying the convolution operations to the (k−1)-th integrated feature map for testing. Next, a detection result for testing of at least one specific object in the test image may be generated by applying the FC operation to the n-th main feature map for testing, or a segmentation result for testing may be generated by inputting the n-th main feature map for testing to the decoding layer.

The CNN capable of encoding the input image with one or more multiple feeding layers in accordance with the present invention may provide information of the input image not only to the 1st convolutional layer but also to the other convolutional layers, to thereby preserve detailed information of the input image.

It would be understood by one of ordinary skill in the art that a transmission and/or a reception of the above-described images such as the training image and the test image can be performed by communication units of the learning device and the testing device, and processes of the convolution operation, the deconvolution operation and the loss value operation can be mainly performed by processors of the learning device and the testing device, but the present invention is not limited to these examples.

The present invention has an effect of preserving the detailed information of the input image in spite of consecutive convolution operations through the CNN, as only a first convolutional layer but also other convolutional layers of the CNN can directly use the information of the input image.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level language code that can be executed by a computer using an interpreter, etc. The hardware device can work as more than a software module to perform the process in accordance with the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A learning method for a CNN (Convolutional Neural Network) configured to encode a training image to train the CNN to detect a presence of a particular object in images, the method comprising:
   (a) inputting a training image having a predetermined size to the CNN, the inputting including
      inputting the training image to a first convolution layer of a conventional CNN to produce a first main feature map, the first feature map having a smaller size than the training image,
      inputting another instance of the training image in a feeding layer that is supplemental to layers in the conventional CNN, and forming a reduced size training image by reducing a size of the training image so a size of a sub feature map produced by the feeding layer matches a size of the first main feature map or matches a size of a subsequent main feature map produced by the second convolution layer or a successive convolution layer of the conventional CNN, the size of the first main feature map and the size of the subsequent main feature map being smaller than a size of the training image and smaller than a size of a main feature map produced by a preceding convolution layer, the sub feature map produced by the feeding layer being applied to an intermediate convolution layer of the conventional CNN, and
   (b) applying, with a computer processor, convolutional operations in a plurality of convolutional layers, the applying comprising
      applying a first portion of the convolutional operations to the training image to form the first main feature map,
      applying a second portion of the convolutional operations to the reduced size training image to create the sub feature map, and
      applying in the second or successive convolution layer the first portion of convolutional operations to a combination of the sub feature map and the first main feature map or a combination of the first sub feature map and the subsequent main feature map to produce a next subsequent main feature map.

2. The learning method of claim 1, wherein the step of (b) further includes steps of:
   (b-1) instructing an m-th feeding layer to generate an m-th reduced size training image by resizing the training image to match the size of main feature map produced by the preceding convolutional layer;
   (b-2) instructing the m-th feeding layer to generate an m-th sub feature map by applying the convolution operations to the m-th reduced size training image;

(b-3) instructing a k-th convolutional layer to generate a (k−1)-th integrated feature map by integrating a (k−1)-th main feature map and the m-th sub feature map; and (b-4) instructing the k-th convolutional layer to generate a k-th main feature map by applying the convolution operations to the (k−1)-th integrated feature map.

3. The learning method of claim 2, wherein, at the step of (b-3), the (k−1)-th integrated feature map is generated by pixel-wise summation of the (k−1)-th main feature map and the m-th sub feature map.

4. The learning method of claim 2, wherein, at the step of (b-3), the (k−1)-th main feature map and the m-th sub feature map are concatenated to generate the (k−1)-th integrated feature map.

5. The learning method of claim 2, wherein, at the step of (b-2), the convolution operations are applied to the m-th reduced size training image so that a number of channels of the m-th sub feature map corresponds to a number of channels of the (k−1)-th main feature map.

6. The learning method of claim 1, wherein the step of (b) includes steps of:
 (b-1) instructing an m-th feeding layer to generate an m-th sub feature map whose size corresponds to the size of a (k−1)-th main feature map by applying the convolution operations to an m-th reduced size training image;
 (b-2) instructing a k-th convolutional layer to generate a (k−1)-th integrated feature map by integrating a (k−1)-th main feature map and the m-th sub feature map; and
 (b-3) the learning device instructing the k-th convolutional layer to generate a k-th main feature map by applying the convolution operations to the (k−1)-th integrated feature map.

7. The learning method of claim 6, wherein, at the step of (b-1), the m-th sub feature map is generated such that a size and a number of the channels are same as those of the (k−1)-th main feature map.

8. The learning method of claim 1, further comprising steps of:
 (c) instructing at least one FC (fully connected) layer to generate a detection result of the particular object in the training image by applying at least one FC operation to an n-th main feature map produced by convolutional layer downstream of the second or successive convolutional layer; and
 (d) outputting one or more loss values by referring to the detection result and its a corresponding ground truth, to thereby learn one or more parameters of the CNN by backpropagating the loss values.

9. The learning method of claim 1, further comprising steps of:
 (c) instructing a decoding layer to generate a segmentation result by inputting an n-th main feature map produced by convolutional layer downstream of the second or successive convolutional layer to the decoding layer; and
 (d) outputting one or more loss values by referring to the segmentation result and a corresponding ground truth, to thereby learn one or more parameters of the CNN by backpropagating the loss values.

10. A testing method for a CNN (Convolutional Neural Network) configured to encode a training image to train the CNN to detect a presence of a particular object in images, the method comprising:
 (a) inputting a test image, on condition that a learning device has performed (1)
  inputting a training image having a predetermined size to the CNN, the input including inputting the training image to a first convolution layer of a conventional CNN to produce a first main feature map, the first feature map having a smaller size than the training image,
  inputting another instance of the training image in a feeding layer that is supplemental to layers in the conventional CNN, and forming a reduced size training image by reducing a size of the training image so a size of a sub feature map produced by the feeding layer matches a size of the first main feature map or matches a size of a subsequent main feature map produced by the second convolution layer or a successive convolution layer, the size of the first main feature map and the size of the subsequent main feature map being smaller than a size of the training image and smaller than a size of a main feature map produced by a preceding convolution layer of the conventional CNN, and
  (2) applying with a computer processor, convolutional operations in a plurality of convolutional layers, the applying comprising
 applying a first portion of the convolutional operations to the training image to form the first main feature map,
 applying a second portion of the convolutional operations to the reduced size training image to create the sub feature map, and
 applying in the second or successive convolution layer the first portion of convolutional operations to a combination of the sub feature map and the first main feature map or a combination of the first sub feature map and the subsequent main feature map to produce the subsequent main feature map; and
  (3) and the CNN has learned one or more parameters of the CNN; and
 (b) the testing device instructing each of the second or subsequent convolutional layers to apply the convolution operations to the test image or a main feature map for testing from a previous convolutional layer, to thereby generate each of the 1st to n-th main feature maps for testing, wherein the instructing includes
 applying the second portion of the convolutional operations to a first reduced size test image to create a sub feature map for the test image, the sub feature map produced by the feeding layer being applied to an intermediate convolution layer of the conventional CNN, and
 applying in the second or successive convolution layer the first portion of the convolutional operations to a combination of the sub feature map for the test image and the first main feature map for the test image or a combination of the first sub feature map for the test image and the subsequent main feature map for the test image to produce the subsequent main feature map for the test image.

11. The testing method of claim 10, wherein the step of (b) includes steps of:
 (b-1) the testing device instructing a m-th feeding layer to generate an m-th reduced size test image by resizing the test image to match the size of main feature map produced by the preceding convolutional layer map for testing;
 (b-2) the testing device instructing the m-th feeding layer to generate an m-th sub feature map for testing by applying the convolution operations to the m-th reduced size test image;
 (b-3) the testing device instructing a k-th convolutional layer to generate a (k−1)-th integrated feature map for testing by integrating a (k−1)-th main feature map for testing and the m-th sub feature map for testing; and (b-4) the testing device instructing the k-th convolutional layer to generate a k-th main feature map for testing by applying the convolution operations to the (k−1)-th integrated feature map for testing.

12. The testing method of claim 11, wherein, at the step of (b-3), the (k−1)-th integrated feature map for testing is generated by pixel-wise summation of the (k−1)-th main feature map for testing and the m-th sub feature map for testing.

13. The testing method of claim 11, wherein, at the step of (b-3), the (k−1)-th main feature map for testing and the m-th sub feature map for testing are concatenated to generate the (k−1)-th integrated feature map for testing.

14. The testing method of claim 10, wherein the step of (b) includes steps of:

(b-1) the testing device instructing an m-th feeding layer to generate an m-th sub feature map for testing whose size corresponds to a size of a (k−1)-th main feature map for testing by applying the convolution operations to the m-th reduced size test image;

(b-2) the testing device instructing a k-th convolutional layer to generate a (k−1)-th integrated feature map for testing by integrating the (k−1)-th main feature map for testing and the m-th sub feature map for testing; and (b-3) the testing device instructing the k-th convolutional layer to generate a k-th main feature map for testing by applying the convolution operations to the (k−1)-th integrated feature map for testing.

15. The testing method of claim 14, wherein, at the step of (b-1), the m-th sub feature map for testing is generated such that the size and the number of the channels are same as those of the (k−1)-th main feature map for testing.

16. A learning device for a CNN (Convolutional Neural Network) configured to encode a training image to train the CNN to detect a presence of a particular object in images, the learning device comprising:

an interface configured to receive the training image, the training image having a predetermined size; and a processor configured to (I)
apply the training image to a first convolution layer to produce a first main feature map, the first feature map having a smaller size than the training image,
input another instance of the training image in a feeding layer that is supplemental to layers in the conventional CNN, and in a feeding layer, form a reduced size training image by reducing a size of the training image so a size of a sub feature map produced by the feeding layer matches a size of the first main feature map or matches a size of a subsequent main feature map produced by the second convolution layer or a successive convolution layer of the conventional CNN, the size of the first main feature map and the size of the subsequent main feature map being smaller than a size of the training image and smaller than a size of a main feature map produced by a preceding convolution layer, the sub feature map produced by the feeding layer being applied to an intermediate convolution layer of the conventional CNN, and
apply convolutional operations in a plurality of convolutional layers, comprising
apply a first portion of the convolutional operations to the training image to form the first main feature map,
apply a second portion of the convolutional operations to the reduced size training image to create a sub feature map, and
apply in the second or successive convolution layer the first portion of convolutional operations to a combination of the sub feature map and the first main feature map or a combination of the first sub feature map and the subsequent main feature map to produce the subsequent main feature map.

17. The learning device of claim 16, wherein the processor is further configured to (I-1) instruct an m-th feeding layer to generate an m-th reduced size training image by resizing the training image to match the size of main feature map produced by the preceding convolutional layer;

(I-2) instruct the m-th feeding layer to generate an m-th sub feature map by applying the convolution operations to the m-th reduced size training image;

(I-3) instruct a k-th convolutional layer to generate a (k−1)-th integrated feature map by integrating a (k−1)-th main feature map and the m-th sub feature map; and (I-4) instruct the k-th convolutional layer to generate a k-th main feature map by applying the convolution operations to the (k−1)-th integrated feature map.

18. The learning device of claim 17, wherein, at (I-3), the (k−1)-th integrated feature map is generated by pixel-wise summation of the (k−1)-th main feature map and the m-th sub feature map.

19. The learning device of claim 17, wherein, at (I-3), the (k−1)-th main feature map and the m-th sub feature map are concatenated to generate the (k−1)-th integrated feature map.

20. The learning device of claim 17, wherein, at (I-2), the convolution operations are applied to the m-th reduced size training image so that a number of channels of the m-th sub feature map corresponds to a number of channels of the (k−1)-th main feature map.

21. The learning device of claim 16, wherein (I) includes:

(I-1) instructing an m-th feeding layer to generate an m-th sub feature map whose size corresponds to the size of a (k−1)-th main feature map by applying the convolution operations to an m-th reduced size training image;

(I-2) instructing a k-th convolutional layer to generate a (k−1)-th integrated feature map by integrating a (k−1)-th main feature map and the m-th sub feature map; and (I-3) instructing the k-th convolutional layer to generate a k-th main feature map by applying the convolution operations to the (k−1)-th integrated feature map.

22. The learning device of claim 21, wherein, at (I-1), the m-th sub feature map is generated such that a size and a number of the channels are same as those of the (k−1)-th main feature map.

23. The learning device of claim 16, wherein the processor is further configured to (II) instruct at least one FC (fully connected) layer to generate a detection result of the particular object in the training image by applying at least one FC operation to an n-th main feature map produced by convolutional layer downstream of the second or successive convolutional layer; and (III) output one or more loss values by referring to the detection result and a corresponding ground truth, to thereby learn one or more parameters of the CNN by backpropagating the loss values.

24. The learning device of claim 16, wherein the processor is further configured to (II) instruct a decoding layer to generate a segmentation result by inputting the n-th main feature map to the decoding layer; and (III) instruct one or more loss values by referring to the segmentation result and its corresponding ground truth, to thereby learn one or more parameters of the CNN by backpropagating the loss values.

25. A testing device for a CNN (Convolutional Neural Network) configured to encode a training image to train the CNN to detect a presence of a particular object in images, the testing device comprising:

an interface configured to (a) input a test image, on condition that a learning device has previously performed (1)

inputting a training image having a predetermined size to the CNN, the input including inputting the training image to a first convolution layer of a conventional CNN to produce a first main feature map, the first feature map having a smaller size than the training image, inputting another instance of the training image in a feeding layer that is supplemental to layers in the conventional CNN, and forming a reduced size training image by reducing a size of the training image so a size of a sub feature map produced by the feeding layer matches a size of the first main feature map or matches a size of a subsequent main feature map produced by the second convolution layer or a successive convolution layer of the conventional CNN, the size of the first main feature map and the size of the subsequent main feature map being smaller than a size of the training image and smaller than a size of a main feature map produced by a preceding convolution layer, the sub feature map produced by the feeding layer being applied to an intermediate convolution layer of the conventional CNN, and (2) applying with a computer processor, convolutional operations in a plurality of convolutional layers, the applying including applying a first portion of the convolutional operations to the training image to form the first main feature map, applying a second portion of the convolutional operations to the reduced size training image to create a sub feature map, applying in the second or successive convolution layer the first portion of the convolutional operations to a combination of the sub feature map and the first main feature map or a combination of the first sub feature map and the subsequent main feature map to produce the subsequent main feature map; and (3) and the CNN has learned one or more parameters of the CNN; and (b) the processor, the processor further configured to instruct each of the convolutional layers to apply the first portion of convolution operations to the test image or a main feature map for testing from a previous convolutional layer, to thereby generate each of the 1st to n-th main feature maps for testing, the processor further configured to apply the second portion of convolutional operations to a first reduced size test image to create a sub feature map for the test image, and apply in the second or successive convolution layer the first portion of convolutional operations to a combination of the sub feature map for the test image and the first main feature map for the test image or a combination of the first sub feature map for the test image and the subsequent main feature map for the test image to produce the subsequent main feature map for the test image.

26. The testing device of claim 25, wherein (I) includes (I-1) instructing a m-th feeding layer to generate an m-th reduced size test image by resizing the test image to match the size of main feature map produced by the preceding convolutional layer map for testing;

(I-2) instructing the m-th feeding layer to generate an m-th sub feature map for testing by applying the convolution operations to the m-th reduced size test image;

(I-3) instructing a k-th convolutional layer to generate a (k−1)-th integrated feature map for testing by integrating a (k−1)-th main feature map for testing and the m-th sub feature map for testing; and (I-4) instructing the k-th convolutional layer to generate a k-th main feature map for testing by applying the convolution operations to the (k−1)-th integrated feature map for testing.

27. The testing device of claim 26, wherein, at (I-3), the (k−1)-th integrated feature map for testing is generated by pixel-wise summation of the (k−1)-th main feature map for testing and the m-th sub feature map for testing.

28. The testing device of claim 26, wherein, at (I-3), the (k−1)-th main feature map for testing and the m-th sub feature map for testing are concatenated to generate the (k−1)-th integrated feature map for testing.

29. The testing device of claim 25, wherein at (I) includes (I-1) instructing an m-th feeding layer to generate an m-th sub feature map for testing whose size corresponds to a size of a (k−1)-th main feature map for testing by applying the convolution operations to the m-th reduced size test image;

(I-2) instructing a k-th convolutional layer to generate a (k−1)-th integrated feature map for testing by integrating the (k−1)-th main feature map for testing and the m-th sub feature map for testing; and (I-3) instructing the k-th convolutional layer to generate a k-th main feature map for testing by applying the convolution operations to the (k−1)-th integrated feature map for testing.

30. The testing device of claim 29, wherein, at (I-1), the m-th sub feature map for testing is generated such that the size and the number of the channels are same as those of the (k−1)-th main feature map for testing.

* * * * *